United States Patent
Pétursson et al.

(10) Patent No.: US 11,177,646 B2
(45) Date of Patent: Nov. 16, 2021

(54) WIND TURBINE GENERATOR CONTROLLER AND METHOD

(71) Applicant: VESTAS WIND SYSTEMS A/S, Aarhus N (DK)

(72) Inventors: Karl Axel Pétursson, Hadsten (DK); Lars Rohrmann Andersen, Hadsten (DK); Jesper Holm, Skødstrup (DK); Henrik Møller Ravn, Galten (DK); David Steele, Skanderborg (DK); Arne Gormsen, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 78 days.

(21) Appl. No.: 16/472,990

(22) PCT Filed: Dec. 11, 2017

(86) PCT No.: PCT/DK2017/050418
§ 371 (c)(1),
(2) Date: Jun. 24, 2019

(87) PCT Pub. No.: WO2018/113870
PCT Pub. Date: Jun. 28, 2018

(65) Prior Publication Data
US 2020/0091703 A1  Mar. 19, 2020

(30) Foreign Application Priority Data

Dec. 22, 2016 (DK) .............................. PA201671036

(51) Int. Cl.
*F03D 9/25* (2016.01)
*F03D 17/00* (2016.01)
(Continued)

(52) U.S. Cl.
CPC ............... *H02H 7/06* (2013.01); *F03D 7/042* (2013.01); *F03D 9/25* (2016.05); *F03D 17/00* (2016.05); *H02K 7/1838* (2013.01)

(58) Field of Classification Search
None
See application file for complete search history.

(56) References Cited

U.S. PATENT DOCUMENTS 8,546,967 B2   10/2013  Ormel et al.
10,608,552 B1 *  3/2020  Choo ...................... H02M 1/32
(Continued)

FOREIGN PATENT DOCUMENTS

CN   1041042 A   4/1990
CN   102022266 A *  4/2011  ............. F03D 17/00
(Continued)

OTHER PUBLICATIONS

CN-102022266-A—Translation Provided by Applicant (Year: 2009).*
(Continued)

*Primary Examiner* — Woody A Lee, Jr.
*Assistant Examiner* — Brian Christopher Delrue
(74) *Attorney, Agent, or Firm* — Patterson + Sheridan, LLP

(57) ABSTRACT

A wind turbine generator controller is described. The controller comprises switching circuitry, for selectively activating and deactivating one or more transducer circuits, and overcurrent detection circuitry, for detecting an overcurrent state in relation to one or more of the transducer circuits. The switching circuitry is responsive to the detection on an overcurrent state to selectively deactivate one or more of the transducer circuits.

13 Claims, 4 Drawing Sheets

(51) Int. Cl.
*F03D 7/04* (2006.01)
*H02H 7/06* (2006.01)
*H02K 7/18* (2006.01)

(56) References Cited

U.S. PATENT DOCUMENTS

| | | | |
|---|---|---|---|
| 2008/0078228 | A1 | 4/2008 | Nies |
| 2010/0037418 | A1* | 2/2010 | Hussey ............... B60L 15/2036 15/319 |
| 2010/0201290 | A1 | 8/2010 | Becker et al. |
| 2013/0057227 | A1* | 3/2013 | Aurtenetxea ........... H02P 9/007 322/28 |
| 2014/0306624 | A1* | 10/2014 | Namuduri ............... F03G 7/065 318/116 |
| 2015/0264464 | A1* | 9/2015 | Okugawa ............. H04R 19/005 381/174 |
| 2018/0284745 | A1* | 10/2018 | Celia .................... G06N 3/0454 |
| 2019/0324431 | A1* | 10/2019 | Celia .................. G05B 23/0289 |
| 2019/0372431 | A1* | 12/2019 | Petursson ................ F03D 17/00 |
| 2020/0348662 | A1* | 11/2020 | Cella .................. G05B 23/0294 |

FOREIGN PATENT DOCUMENTS

| | | |
|---|---|---|
| CN | 102022266 A | 4/2011 |
| CN | 203685473 U | 7/2014 |
| CN | 104061121 A | 9/2014 |
| CN | 104375048 A | 2/2015 |
| EP | 2048720 A2 | 4/2009 |
| JP | S6419915 A | 1/1989 |
| JP | H04340321 A | 11/1992 |
| WO | 2010130057 A2 | 11/2010 |
| WO | 2016050249 A1 | 4/2016 |

OTHER PUBLICATIONS

PCT Written Opinion of the International Searching Authority for Application No. PCT/DK2017/050418 dated Feb. 3, 2018.
PCT International Search Report for Application No. PCT/DK2017/050418 dated Feb. 3, 2018.
Danish Patent and Trademark Office 1st Technical Examination of Patent Application PA 2016 71036 dated Jul. 3, 2017.
Chinese Office Action for Application No. 201780079876.1 dated Mar. 23, 2020.

* cited by examiner

WIND TURBINE GENERATOR CONTROLLER AND METHOD

FIELD OF THE INVENTION

The present invention relates to a wind turbine generator controller and method.

BACKGROUND TO THE INVENTION

A typical wind turbine may comprise a fixed tower which stands on the ground or sea bed, and a nacelle which rests on the top of the tower and carries a turbine shaft, a gearbox, a brake, a generator, a blade pitch controller which controls the angle of the turbine blades, and yaw drives which control the position of the wind turbine relative to the wind. Turbine blades are mounted to the turbine shaft externally of the nacelle. The turbine blades cause the shaft to rotate under the influence of wind, which in turn drives the generator to generate electrical power.

The overall operation of a wind turbine is controlled by a control system. The control system comprises sensors for determining the current status of the turbine equipment and operation, and the local environment, a processor for handling the outputs of those sensors, and actuators for controlling turbine operation. Cables used in turbines need overcurrent protection, or else there may be a fire hazard in case of a short circuit or other overcurrent situation. At present, this is provided by using external circuit breakers or other protection devices. These add cost and serve little other purpose than keeping the turbine safe.

It is against this background that the invention has been devised.

SUMMARY OF THE INVENTION

In a first aspect, the invention provides a wind turbine generator controller, the controller comprising:
  switching circuitry, for selectively activating and deactivating one or more transducer circuits; and
  overcurrent detection circuitry, for detecting an overcurrent state in relation to one or more of the transducer circuits; wherein
  the switching circuitry is responsive to the detection on an overcurrent state to selectively deactivate one or more of the transducer circuits.

In this way, circuit protection is possible without using external components. By integrating this functionality into the controller hardware it is possible to reduce complexity and save money. It is also possible to provide a higher diagnostics capability as an individual (or small group) of transducers can be protected.

The overcurrent detection circuitry may detect an overcurrent state based on a stuck-at-low condition detected on a transducer circuit. Alternatively to, or as well as, the stuck at low detection, the overcurrent detection circuitry may comprise a current measurement device for measuring the current through one or more transducer circuits. In this case, the overcurrent detection circuitry compares a current measured by the current measurement device with a threshold value to detect an overcurrent state.

The switching circuitry may selectively activate and deactivate transducer circuits within a group of transducer circuits. The current measurement device may measure the current through the transducer circuits in the group. The switching circuitry may be responsive to the current through one or more of the transducer circuits in the group being measured as exceeding a threshold level to selectively deactivate one or more of the transducer circuits.

The switching circuitry may receive electrical power for operating the one or more transducer circuits, and comprise an output to each of the one or more transducers. In this case, the overcurrent detection circuitry may be provided at the input side of the switching circuitry, and the switching circuitry may selectively activate a transducer circuit by switching on the output of the switching circuitry which is connected to that transducer circuit.

The switching circuitry may be responsive to the current measurement device detecting an overcurrent through one or more of the transducer circuits in that group to switch off the outputs to all transducers in that group. The current measurement device may measure the combined current through the transducer circuits in that group, and deactivate all transducer circuits in that group if the combined current exceeds a predetermined threshold. Once all transducer circuits in the group have been deactivated, the transducer circuits may be individually switched on in turn to identify the transducer circuit causing an overcurrent. The switching circuitry may be operable to reactivate a deactivated transducer circuit one or more times to identify if the overcurrent state has ceased.

The switching circuitry may only deactivate a transducer circuit if the measured current exceeds the threshold level for longer than a predetermined period of time.

To measure the current through a transducer circuit in a group, the switching circuity may activate then deactivate each of the transducer circuits in the group individually in turn so that only a single transducer circuits is activated at once, and the current measurement device measures the current across the group as each transducer is activated. Alternatively, to measure the current through a transducer, the switching circuitry may either activate a selected transducer in the group while keeping previously activated transducers active, and the measurement device measures a difference in the current measurement associated with activating the selected transducer, or the switching circuitry may deactivate a selected transducer in the group while keeping previously activated transducers active, and the measurement device measures a difference in the current measurement associated with deactivating the selected transducer.

In a second aspect, the invention provides a method of controlling transducers in a wind turbine generator control system, the method comprising:
  detecting an overcurrent state in relation to one or more transducer circuits; and
  responsive to the detection on the overcurrent state, selectively deactivating one or more of the transducer circuits.

Other aspects of the invention include a wind turbine control system comprising the diagnostic apparatus set out above, a wind turbine generator comprising such a wind turbine control system, and a computer program product carrying a computer program for performing the above method.

Generally, the present techniques apply equally to both sensors and actuators as forms of transducer. Accordingly, these terms are often used interchangeably herein.

DETAILED DESCRIPTION OF EMBODIMENTS OF THE INVENTION

Figure 1:
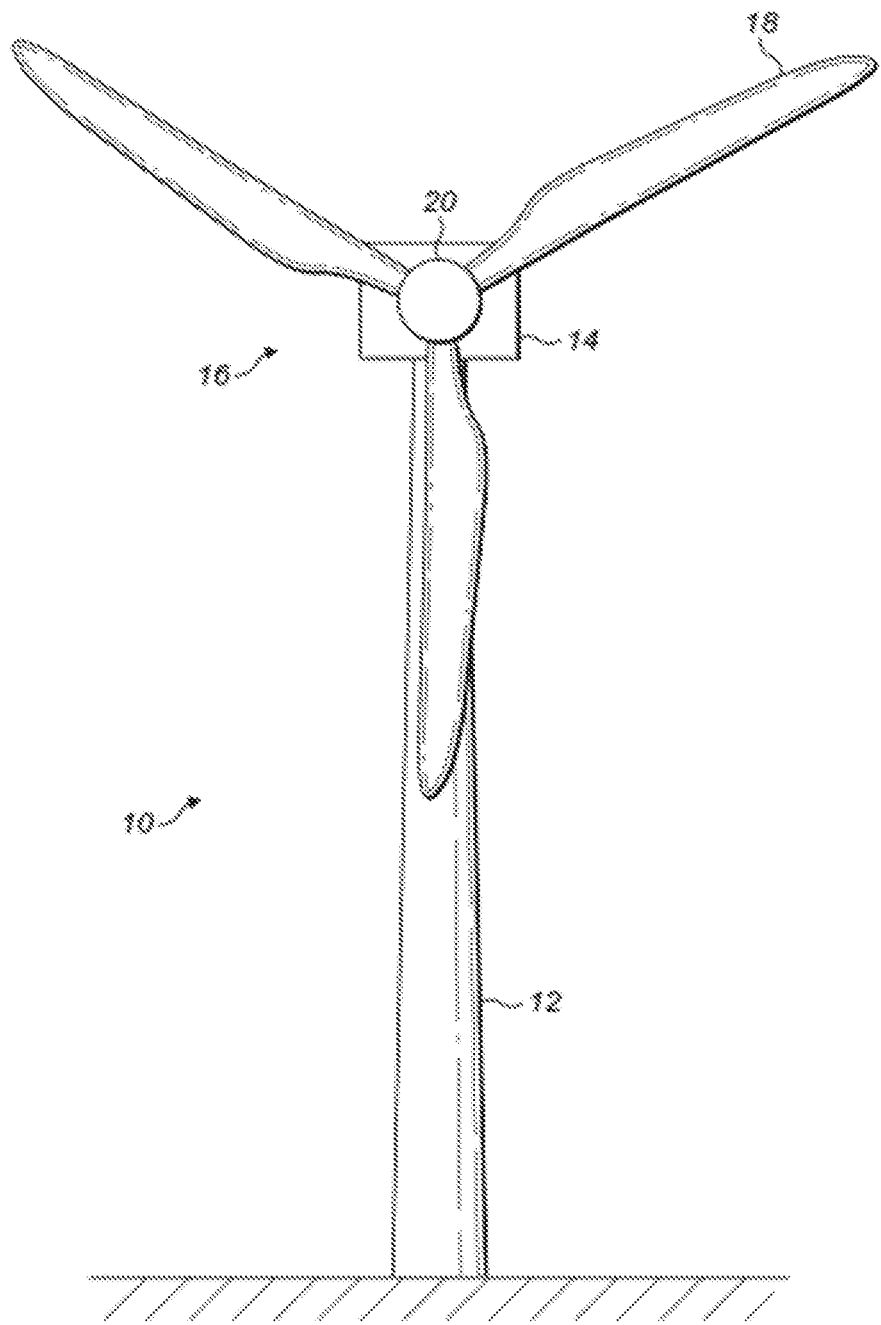
FIG. 1 is a schematic drawing of a wind turbine generator.

FIG. 1 shows a wind turbine 10 comprising a tower 12 supporting a nacelle 14 to which a rotor 16 is mounted. The rotor 16 comprises a plurality of wind turbine blades 18 that extend radially from a central hub 20. In this example, the rotor 16 comprises three blades 18. As discussed above, the pitch (angle of attack with respect to the wind) of the wind turbine blades 18 can be adjusted by a blade pitch controller (not shown), while the yaw of the nacelle 14 can be adjusted by a yaw drive (not shown) to face generally into the wind. The rotor 16 is mounted on a main bearing (not shown), which permits the rotor to rotate freely about its axis. The wind turbine blades 18 are each mounted to the rotor via blade bearings (not shown), which permit the blade 18 to rotate about their longitudinal axis to adjust their pitch. It will be understood that many such wind turbines can be established in a site, or wind farm, covering an area of several square kilometres.

The overall operation of the wind turbine 10 is controlled by a control system. Part of such a control system is shown in FIGS. 2A and 2B.

Figure 2A:
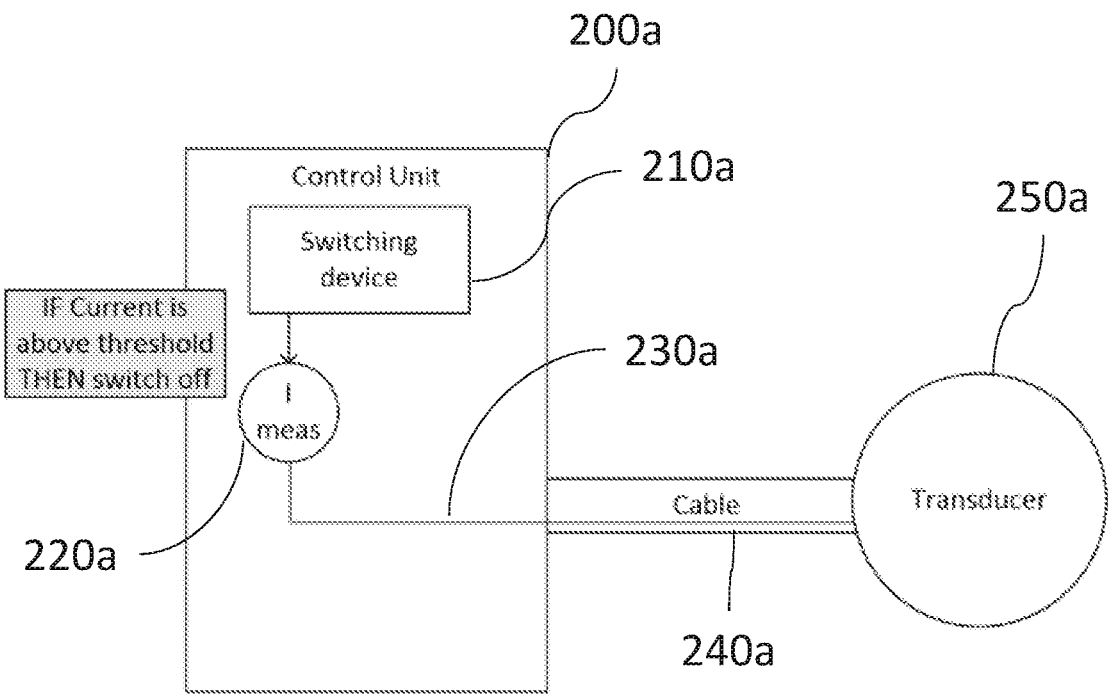
FIGS. 2A and 2B are schematic drawings of a transducer control system.

In FIG. 2A, a control unit 200a comprises a switching device 210a which is able to provide power to a transducer 250a on an output line 230a, which carries electrical power and control signals to the transducer 250a. The transducer 250a may be a sensor or an actuator. The electrical connection between the control unit 200a and the transducer 250a is conveyed through a cable 240a. A current measurement device 220a is provided on the output line 230a and is able to measure the current through the output line 230a, and thus through a transducer circuit comprising the switching device 210a, the output line 230a, the cable 240a and the transducer 250a. The control unit 200a compares the measured current with a threshold current to detect an overcurrent state. This could be caused by a short circuit in the output line 230a (for example in the cable 240a), or by a fault with the transducer 250a. The control unit 200a is also able to monitor an output status feedback signal to detect a stuck-at-low (short-circuit to 0V) condition at the output of the switching device 210a. Either or both of the output status feedback signal and the current measurement can be used to detect an overcurrent state, and thus to decide whether to turn off the output of the switching device 210a due to overcurrent. In one implementation, the output status feedback signal may be used to detect overcurrent (and thus switch off the transducer circuit) in the case of low-power outputs, while the current measurement device may be used to detect overcurrent (and thus switch off the transducer circuit) in the case of high-power outputs.

Figure 2B:
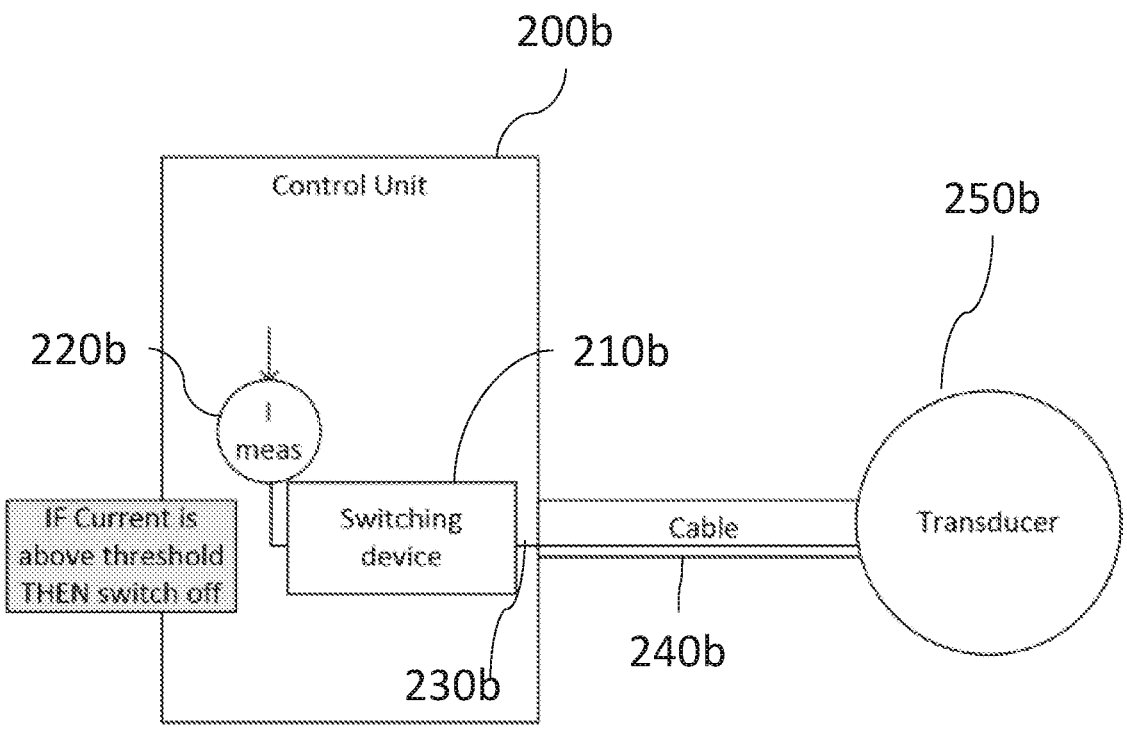

In FIG. 2B, a control unit 200b comprises a switching device 210b which is able to provide power to a transducer 250b on an output line 230b, which carries electrical power and control signals to the transducer 250b. The transducer 250b may be a sensor or an actuator. The electrical connection between the control unit 200b and the transducer 250b is conveyed through a cable 240b. A current measurement device 220a is provided at an input to the switching device 210b and is able to measure the current through the switching device 210b (and thus through the output line 230b, cable 240b and transducer 250b, since these form a complete transducer circuit). The control unit 200b compares the measured current with a threshold current to detect an overcurrent state, as for FIG. 2A. Again, similarly with FIG. 2A, the control unit 200b is also able to monitor an output status feedback signal to detect a stuck-at-low (short-circuit to 0V) condition at the output of the switching device 210b. Either or both of the output status feedback signal and the current measurement can be used to detect an overcurrent state, and thus to decide whether to turn off the output of the switching device 210b due to overcurrent.

It will be appreciated that, in some cases the current may exceed the predetermined threshold only briefly, due to transients. Accordingly, a low pass filter may be applied so that the switching circuitry only deactivates a transducer circuit if the measured current exceeds the threshold level for longer than a predetermined period of time.

It will be appreciated that the controller 200a of FIG. 2A or the controller 200b of FIG. 2B may be provided with a dedicated switching device 210a, 210b and corresponding dedicated current measurement device 220a, 220b for each of a plurality of transducers 250a, 250b. In this case, the current threshold for determining an overcurrent state may differ between transducers. The controller 200a, 200b may be software programmable, with the thresholds for the transducers being dynamically updated centrally.

Figure 3:
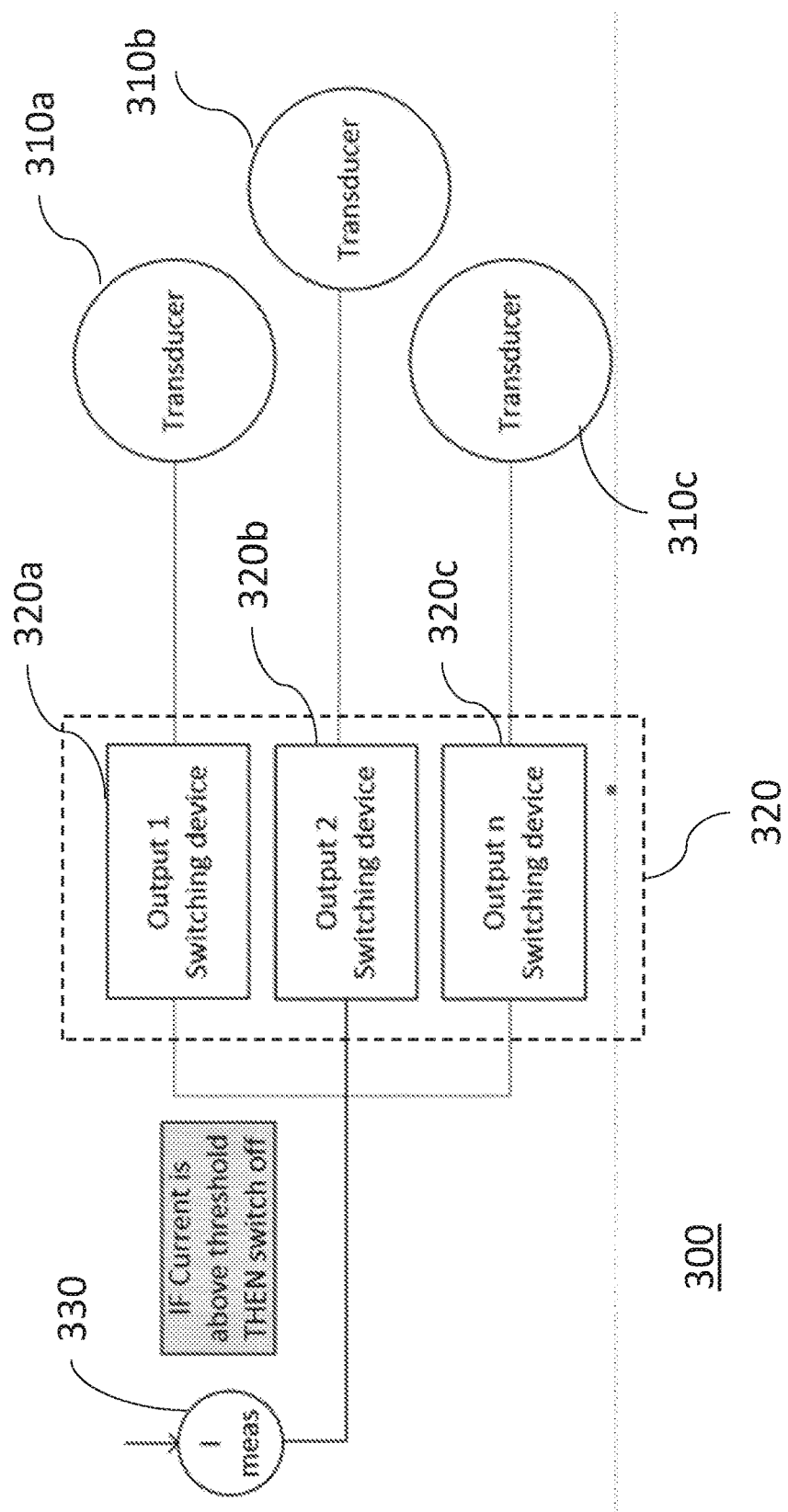
FIG. 3 is a schematic drawing of a transducer control system.

In FIG. 3, an example wind turbine generator control system 300 can be seen to comprise transducers 310a, 310b, 310c. The transducers may be sensors for determining the current status of the turbine equipment and operation, and the local environment, or actuators for controlling turbine operation. It will be understood that in a real control system a large number of transducers are provided, whereas in the described example we refer to only 3 transducers for the sake of simplicity. The control system 300 also comprises switching circuitry 320 (corresponding to the switching devices 210a, 210b in FIG. 2) which serves two purposes. Firstly, the switching circuitry 320 provides electrical power to the transducers 310a, 310b, 310c. Secondly, the switching circuitry 320 is able to selectively activate and deactivate the transducers 310a, 310b, 310c in order both to diagnose overcurrent in relation to individual ones or groups of transducers at the output of the switching circuitry 320, and to provide a protection function by selectively switching off faulty transducer circuits (that is, transducer circuits in relation to which an overcurrent has been detected). The switching circuitry 320 comprises output switching devices 320a, 320b and 320c—that is, one output switching device for each transducer in the group. More specifically, the switching device 320a is able to selectively provide electrical power to the transducer 310a, the switching device 320b is able to selectively provide electrical power to the transducer 310b and the switching device 320c is able to selectively provide electrical power to the transducer 310c. The control system 300 also comprises a current measurement device 330. In particular, a single current measurement device 330 is provided, at the input of the switching circuitry 320, for the whole group of transducers 310a, 310b, 310c. In other words, a single current measurement device measures the current through the whole group of transducers, rather than a single current measurement device being provided for each transducer. Groups of transducers are therefore provided with a single current measurement and the ability to turn on and off the output to each individual transducer (using the switching circuitry 320).

Various transducer activation and deactivation strategies can then be used to determine the current through individual transducers. For example, each of the transducers in the group may be activated and then deactivated individually in turn so that only a single transducer is activated at a time, with the current through the group being measured as each transducer is activated. In this case, the current through the group will be the current through the selected transducer (since no other transducers within the group are active at the time of the current measurement)—permitting direct measurement of the current through that transducer. In another example a selected transducer in the group may be activated while keeping previously activated transducers active, with the current through the group being measured before and after the activation of the selected transducer. In this case, a difference in the current measurement associated with activating the selected transducer is determined—by measuring the current before and after activation and comparing the two current measurements. In yet another example, a selected transducer in the group may be deactivated while keeping previously activated transducers active, with the current through the group being measured before and after the deactivation of the selected transducer. In this case, a difference in the current measurement associated with deactivating the selected transducer is determined—by measuring the current before and after deactivation and comparing the two current measurements. In the latter two examples it will be appreciated that the current through the selected transducer will be the difference between the current measurements made before and after activation/deactivation. The current measured (or inferred) for each transducer circuit is compared with a suitable threshold value (which may be software programmable, and may differ between transducer circuits) to determine whether that transducer circuit is in an overcurrent state. Once an overcurrent state has been identified in relation to one or more of the transducers in the group, that (or those) transducer(s) can be deactivated by the switching circuitry 320.

In FIG. 3, as with FIGS. 2A and 2B, the control system 300 also comprises output feedback circuitry (not shown) which measures the output line from each of the switching devices 320a, 320b, 320c to determine if these have a high value or a low value. If a high value would be expected (because the switching circuitry 320 is set to provide power via the switching device) and a low value is detected, this indicates that the output line is stuck at a low state when the output to the line is set to a high state. This can be indicative of an overcurrent scenario, and can therefore be used as a trigger to deactivate the switching device in relation to which such a feedback signal occurs. More generally, the control system 300 is able to monitor an output status feedback signal at each of the outputs of the switching circuitry 320 to detect a stuck-at-low (short-circuit to 0V) condition at the output of one (or more) of the switching devices 320a, 320b, 320c. Either or both of the output status feedback signal and the current measurement can be used to detect an overcurrent state, and thus to decide whether to turn off the output of the switching device 210b due to overcurrent.

In some cases, the first detection of an overcurrent may be in relation to the current measured through all transducers circuits currently active (by way of the switching circuitry 320) exceeding a combined threshold value for the group. In this case, the switching circuitry 320 may deactivate all transducer circuits in the group immediately, in the interests of safety, but then selectively reactivate the transducer circuits one at a time (or in sub groups) to identify which one of the transducer circuits is giving rise to the overcurrent condition. The faulty transducer circuit can then be permanently deactivated pending repair by an engineer, while the other transducer circuits can be reactivated, in some cases permitting turbine operation to continue.

Once an overcurrent state has been detected in relation to a transducer circuit, the controller may operate the switching circuitry to reactivate a deactivated transducer circuit one or more times to identify if the overcurrent state has ceased. If the overcurrent state in relation that that transducer circuit persists following (for example) one or two reactivations, then that transducer circuit may be deactivated permanently pending repair.

When an overcurrent state is detected in relation to a transducer circuit or a group of transducer circuits, an overcurrent notification can be generated to alert a user of the condition, to enable remedial action to be taken. The overcurrent notification may indicate the faulty transducer circuit and/or the group of transducer circuits which have been deactivated. As a result, an engineer is able to bring along the correct tools and parts to affect a repair.

Figure 4:
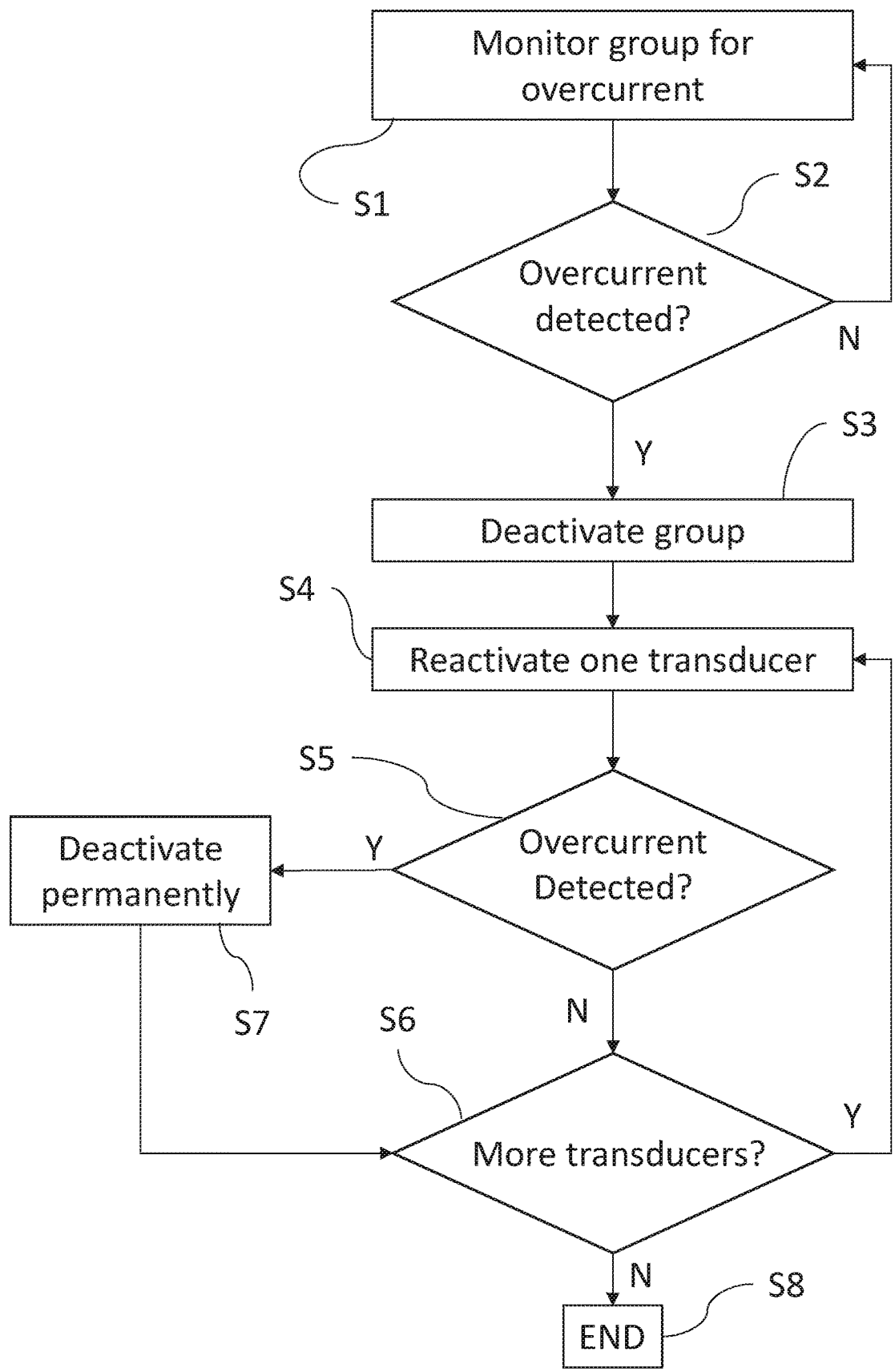
FIG. 4 is a schematic flow diagram of a transducer control method.

Referring to FIG. 4, an example procedure for detecting overcurrents, shutting down transducer circuits and identifying a faulty transducer circuit is described. At a step S1, a group of transducer circuits are monitored for an overcurrent condition, using one or both of the group current measurement and feedback signal monitoring described above. If at a step S2 it is determined that there is no overcurrent, then the process returns in a loop to the step S1. If an overcurrent is detected at the step S2, then the entire group of transducer circuits is initially deactivated at a step S3. At a step S4, one of the transducer circuits is reactivated, and observed with respect to overcurrent detection. If at a step S5 an overcurrent is detected in relation to the reactivated transducer circuit then at a step S7 that transducer circuit is deactivated permanently (although note the option above of permitting multiple reactivation attempts). The process then moves to the step S6, where it is determined if there are any more transducer circuits in the group which have not yet been reactivated or permanently deactivated. If there are no further transducer circuits to reactivate or permanently deactivate, then the process ends at the step S8. Otherwise, if there are further transducer circuits to reactivate, then the process returns to the step S4. If at the step S5 the reactivated transducer circuit is discovered not to be causing an overcurrent condition, then it remains active and the process moved on to the step S6.

It will be appreciated that the present technique includes any combination of turning power on to transducers in the wind turbine generator, to enable current consumption measurement on each individual transducer, and to enable faulty transducer circuits to be selectively deactivated. Current measurement may be made on one channel to many transducers. The current measurement may be continuous with measurement intervals of 10 msec or shorter. The current measurement data may be available to low-level software (firmware) functions executing the overcurrent protection as well as to an application software level for diagnostic and alerting purposes. The overcurrent protection function monitors the current measurement data continuously and if an overcurrent is detected, an immediate response is executed (turning of the output immediately or after a configurable time depending on requirements). The overcurrent protection function may reside in low-level software (firmware). The present technique uses the switching circuitry to individually or sequentially control outputs, relying on functions that utilize current measurement data sampled before a state change on a switching circuitry and current measurement data sampled after a state change on a switching circuitry in a comparison function. The data utilized is the continuously measured current described above.

From a control perspective it is possible to use the group current measurement for the low-power outputs to decide whether to turn off an output, possibly in combination with the stuck-at-low detection. The current protection may also be used on outputs which have individual switching circuitry and current measurement circuitry (as opposed to group current measurement).

By measuring current (detecting overcurrent) and also controlling the outputs to transducers circuits directly, a protection function within the controller itself is possible without relying on external circuit breakers. The present technique integrates an overcurrent protection capability into a wind turbine control system without adding any external components (such as circuit breakers), thereby lowering complexity for routing and cabling. The overcurrent protection functionality may be software configurable.

The present technique enables overcurrent protection without using physical circuit breakers. Instead, current is continuously monitored and power will be removed from the individual (or a group of) output(s) should the measured current be above a predefined threshold as a built in functionality in a turbine control system. The technique enables a high level of safety for cables, connectors and transducers as the overcurrent limit can be customised for each output and updated from a central location if needed (thereby reducing error correction time).

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A wind turbine generator controller comprising:
   overcurrent detection circuitry configured to detect an overcurrent state in relation to one or more transducer circuits; and
   switching circuitry configured to:
      apply a low pass filter such that the switching circuitry selectively deactivates one or more of the transducer circuits only when the overcurrent state lasts for longer than a predetermined period of time; and
      selectively activate the one or more of the transducer circuits after the overcurrent state ends.

2. The wind turbine generator controller according to claim 1, wherein the overcurrent detection circuitry detects the overcurrent state based on a stuck-at-low condition detected on a transducer circuit.

3. The wind turbine generator controller according to claim 1, wherein the overcurrent detection circuitry comprises a current measurement device for measuring a current through one or more transducer circuits.

4. The wind turbine generator controller according to claim 3, wherein the switching circuitry selectively activates and deactivates transducer circuits within a group of transducer circuits, and wherein the current measurement device measures the current through the transducer circuits in a group and wherein the switching circuitry is responsive to the current through one or more of the transducer circuits in the group being measured as exceeding a threshold level, to selectively deactivate one or more of the transducer circuits.

5. The wind turbine generator controller according to claim 1, wherein the switching circuitry receives electrical power for operating the one or more transducer circuits, and comprises an output to each of the one or more transducer circuits, the overcurrent detection circuitry being provided at an input side of the switching circuitry, and wherein the switching circuitry selectively activates a transducer circuit by switching on the output of the switching circuitry which is connected to that transducer circuit.

6. The wind turbine generator controller according to claim 4, wherein the switching circuitry is responsive to the current measurement device detecting the overcurrent state through one or more of the transducer circuits in that group to switch off outputs to all transducers in that group.

7. The wind turbine generator controller according to claim 6, wherein the current measurement device measures a combined current through the transducer circuits in that group, and deactivates all transducer circuits in that group if the combined current exceeds a predetermined threshold.

8. The wind turbine generator controller according to claim 7, wherein once all transducer circuits in the group have been deactivated, the transducer circuits are individually switched on in turn to identify the transducer circuit causing the overcurrent state.

9. The wind turbine generator controller according to claim 1, wherein the switching circuitry is operable to reactivate a deactivated transducer circuit one or more times to identify if the overcurrent state has ceased.

10. The wind turbine generator controller according to claim 3, wherein to measure the current through a transducer circuit in a group, the switching circuitry activates then deactivates each of the transducer circuits in the group individually in turn so that only a single transducer circuits is activated at once, and the current measurement device measures the current across the group as each transducer is activated.

11. The wind turbine generator controller according to claim 3, wherein to measure the current through a transducer, the switching circuitry either activates a selected transducer in a group while keeping previously activated transducers active, and the current measurement device measures a difference in a current measurement associated with activating the selected transducer, or the switching circuitry deactivates a selected transducer in the group while keeping previously activated transducers active, and the current measurement device measures a difference in a current measurement associated with deactivating the selected transducer.

12. A method of controlling transducers in a wind turbine generator control system, the method comprising:
   detecting an overcurrent state in relation to one or more transducer circuits; and
   applying a low pass filter to selectively deactivate one or more of the transducer circuits only when the overcurrent state lasts for longer than a predetermined period of time; and
   selectively activating the one or more of the transducer circuits after the overcurrent state ends.

13. A wind turbine comprising:
a tower;
a nacelle disposed on the tower;
a rotor extending from the nacelle;
a plurality of blades coupled to a distal end of the rotor; and
a wind turbine generator controller, comprising:
   overcurrent detection configured to detect an overcurrent state in relation to one or more transducer circuits; and
   switching circuitry configured to:
      apply a low pass filter such that the switching circuitry selectively deactivates one or more of the transducer circuits only when the overcurrent state lasts for longer than a predetermined period of time; and
      selectively activate the one or more of the transducer circuits after the overcurrent state ends.

\* \* \* \* \*